United States Patent [19]
Rosow et al.

[11] Patent Number: 5,841,525
[45] Date of Patent: Nov. 24, 1998

[54] METHOD AND APPARATUS FOR PERFORMING MODULATION TRANSFER FUNCTION TESTS ON ENDOSCOPES

[75] Inventors: Eric Rosow, Avon; Finton Beatrice, Vernon, both of Conn.

[73] Assignee: Hartford Hospital, Hartford, Conn.

[21] Appl. No.: 822,330

[22] Filed: Mar. 20, 1997

[51] Int. Cl.$^6$ .................................................. G01M 11/00
[52] U.S. Cl. ...................................................... 356/124.5
[58] Field of Search .......................... 356/124, 124.5, 356/125, 121, 127, 73, 73.1, 237, 239, 430; 33/281, 1 BB; 250/227, 205, 572

[56] References Cited

U.S. PATENT DOCUMENTS

| | | | |
|---|---|---|---|
| 4,349,014 | 9/1982 | Takamatsu | 128/6 |
| 4,375,818 | 3/1983 | Suwaki et al. | 128/660 |
| 4,402,311 | 9/1983 | Hattori | 128/4 |
| 4,562,344 | 12/1985 | Mihara et al. | 250/201 |
| 4,590,924 | 5/1986 | Tanikawa et al. | 128/6 |
| 4,621,618 | 11/1986 | Omagari | 128/6 |
| 4,686,964 | 8/1987 | Yunoki et al. | 128/4 |
| 4,742,815 | 5/1988 | Ninan et al. | 128/6 |
| 4,930,861 | 6/1990 | Okabe et al. | 350/96.25 |
| 4,996,975 | 3/1991 | Nakamura | 128/6 |
| 5,045,934 | 9/1991 | Kikuchi | 358/98 |
| 5,270,825 | 12/1993 | Takasugi et al. | 358/209 |
| 5,444,574 | 8/1995 | Ono et al. | 359/708 |
| 5,469,840 | 11/1995 | Tanii et al. | 600/117 |
| 5,503,320 | 4/1996 | Webster et al. | 227/176.1 |
| 5,539,971 | 7/1996 | Kelly | 29/418 |
| 5,545,120 | 8/1996 | Chen et al. | 600/117 |

*Primary Examiner*—Frank G. Font
*Assistant Examiner*—Michael P. Stafira
*Attorney, Agent, or Firm*—McCormick, Paulding & Huber

[57] ABSTRACT

In a method and apparatus for performing an MTF test on endoscopes, a beam of light is filtered through a sinusoidally-varying medium defining a transmittance which is approximately uniform along a first direction within the medium, and which varies sinusoidally along a second direction within the medium thereby generating a beam defining an intensity which varies sinusoidally in a predetermined direction. The filtered beam is transmitted through an endoscope from a first end through a second end of the endoscope, and a video system generates signals indicative of the optical intensity of the transmitted beam at each of a plurality of predetermined locations within the beam. Noise is filtered from the intensity signals, and the filtered intensity signals are in turn used in determining the MTF at each of a plurality of predetermined locations within the beam, thereby providing an indication of the optical performance characteristics of the endoscope.

10 Claims, 8 Drawing Sheets

METHOD AND APPARATUS FOR PERFORMING MODULATION TRANSFER FUNCTION TESTS ON ENDOSCOPES

FIELD OF THE INVENTION

The present invention relates to methods and apparatus for testing optical systems, and more particularly, to such methods and apparatus for performing a modulation transfer function ("MTF") test on fiber optic endoscopes.

CROSS REFERENCE TO RELATED APPLICATIONS

Some of the matter contained herein is disclosed in U.S. patent application Ser. No. 08/821,112, entitled "METHOD AND APPARATUS FOR EVALUATING THE PERFORMANCE CHARACTERISTICS OF ENDOSCOPES" (Attorney Docket No. 5509-01); U.S. patent application Ser. No. 08/831,601, entitled "APPARATUS FOR EVALUATING THE PERFORMANCE CHARACTERISTICS OF ENDOSCOPES" (Attorney Docket No. 5509-03); and U.S. patent application Ser. No. 08/822,282, entitled "AUTOMATED METHOD AND APPARATUS FOR EVALUATING THE PERFORMANCE CHARACTERISTICS OF ENDOSCOPES" (Attorney Docket No. 5509-04), each of which is being filed on even date herewith, is assigned to the Assignee of the present invention, and is hereby expressly incorporated by reference as part of the present disclosure.

BACKGROUND OF THE INVENTION

A typical endoscope comprises a cylindrical stainless steel case enclosing a bundle of optical fibers extending between a distal end (tip end) and proximal end of the endoscope for transmitting light through the endoscope. A fiber optic cable delivers light from a light source into the case through an aperture situated near the proximal end of the endoscope. The optical fibers transmit the light through to the distal end, where the light exits the endoscope and illuminates the area near the distal end. The endoscope in turn transmits an image of that area through the optical fibers to an eyepiece lens at the proximal end. A video camera coupled to the eyepiece converts the image into electronic signals and transmits the signals to a video monitor, where the image is displayed.

Endoscopes are used most often in "minimally invasive surgery", in which an endoscope is inserted into a patient, allowing a surgeon to illuminate and view the interior of the patient with minimal penetration. The use of endoscopic surgery is growing, in large part because it is generally safer and less expensive than conventional surgery, and patients tend to require less time in a hospital after endoscopic surgery. Conservative industry experts estimate that about 4 million minimally invasive procedures were performed in 1996. As endoscopic surgery becomes more common, there is an increasing need to accurately evaluate the performance characteristics of endoscopes.

It has been recognized that the endoscope lens should be evaluated in order to obtain a true measure of the performance of an endoscope. The lens may distort images or blur the sharpness of image colors. These and other shortcomings in the optical performance of endoscopes may be the result of imperfections in the manufacturing process and/or may develop as the endoscope is used over time.

The Modulation Transfer Function (MTF) is commonly used in assessing the degree to which an optical system reduces the sharpness (contrast) of transmitted images. An image typically has an intensity which varies, and the modulation of the image measures this variation. The modulation of the image is correlated with the contrast (sharpness) of the image.

The modulation at a location in an image is defined by the maximum intensity and the minimum intensity at that location as follows:

modulation=(maximum intensity−minimum intensity)÷(maximum intensity+minimum intensity).

As used herein, the terms "maximum intensity" and "minimum intensity" refer to the local maxima and minima, respectively, of a cycle in a periodically-varying intensity.

It has been recognized that an endoscope reduces the modulation of a transmitted image, so that the transmitted image is not as sharp as the image received at the endoscope tip. The Modulation Transfer Ratio (MTR) is a measure of the change in an image's modulation after transmission through an endoscope, and is defined as follows:

MTR = modulation of image after transmission ÷ modulation of image before transmission.

It has been further recognized that measuring the MTR of an endoscope while it transmits an image having an intensity which varies along a direction at a predetermined spatial frequency is equivalent to measuring the modulation transfer function (MTF) of the endoscope at the predetermined spatial frequency.

The MTF of an optical system is defined by the system's response to a sinusoidal intensity variation. However, in conventional methods for determining the MTF of an optical system, the system's response to a square-wave intensity variation is measured, and this response is used to indirectly determine the MTF. A square-wave intensity variation is frequently used because it is a much easier variation to generate. The system's response to the square-wave intensity variation is known as the contrast transfer function (CTF), and may be used to determine the MTF using the following infinite series:

$$MTF_n = (\pi/4)\,(CTF_n + (\tfrac{1}{3})CTF_{3n} - (\tfrac{1}{5})CTF_{5n} + (\tfrac{1}{7})CTF_{7n} - \ldots)$$

wherein:

$MTF_i$ is the MTF at a frequency i (e.g., cycles per millimeter); and $CTF_i$ is the CTF at a frequency i (e.g., cycles per millimeter).

Unfortunately, determining an MTF from a CTF involves evaluating the above infinite series, or approximating it by evaluating a subset of terms from the infinite series. Furthermore, although the MTF of a combination of components is the product of the MTF values of each component, the corresponding CTF values of the components cannot be cascaded in this manner since the CTF of the combination of components is a nonlinear function of the component CTFs. Thus, it is extremely difficult to precisely determine the MTF from a set of CTFs in an optical system, such as an endoscope, having several optical components. It is likewise difficult to obtain the MTF of a single component based on the CTF of the entire combination of optical components.

A further complication which arises in performing an MTF test on endoscopes is the introduction of noise into the test results. Typically, a camera coupled to the endoscope records the image transmitted through the endoscope during an MTF test. All electrical devices such as cameras introduce noise into the signals generated by the camera, and thus the noise affects the calculation of the MTF. Such noise signals cannot easily be attenuated without also attenuating the test result signals and skewing the determination of the MTF. It would be ideal to provide an MTF test for use with endoscopes which is not noticeably susceptible to degradation from noise signals.

Color video cameras introduce even greater noise than black-and-white cameras, but are preferable over black-and-white cameras because they reproduce higher quality images even under poor illumination. Accordingly, it would also be desirable to provide an MTF test for use with endoscopes which is not noticeably susceptible to degradation from noise signals generated by color video cameras.

Accordingly, it is an object of the present invention to provide an effective method and apparatus for performing an MTF test on endoscopes, such as fiber optic endoscopes used in medical applications.

SUMMARY OF THE INVENTION

The present invention is directed to an apparatus and method for performing an MTF test on endoscopes, wherein a beam of light is transmitted through a diffusing medium, creating a beam of substantially uniform intensity which is itself filtered through a semi-transparent medium having a transmittance which is substantially constant in a first direction along the medium, and varies approximately sinusoidally in a second direction transverse to the first direction. As a result, the filtered beam defines an intensity which is substantially constant in the first direction and varies approximately sinusoidally in the second direction.

The filtered beam is transmitted through the endoscope from a first end of the endoscope through a second end, and a video system generates signals indicative of the optical intensity of the transmitted beam at each of a plurality of predetermined locations within the beam. In the preferred embodiment, the predetermined locations are at the approximate center of the transmitted beam, and other select locations on the periphery of the beam, including above center, below center, to the right of center, and to the left of center.

The intensity signals are filtered to remove or substantially attenuate noise signals. Preferably, this is accomplished by selecting an angle between a horizontal scan direction of the video system and the second direction, and rotating the semi-transparent medium relative to the video system's scan direction accordingly. Different angles between the scan direction and the second direction define different frequencies of the intensity signals. The angle is selected such that the intensity signals define a frequency which is sufficiently different from the frequency of the noise signals to allow the noise to be substantially attenuated without noticeably attenuating the intensity signals.

A second set of signals indicative of the MTF of the endoscope at the predetermined locations are generated in response to the intensity signals. The second set of signals thus provide an indication of the optical performance characteristics of the endoscope. Preferably, graphical, alphanumeric and/or numerical indicia are generated which are indicative of the performance characteristics.

One advantage of the apparatus and method of the present invention is that the lens of an endoscope, such as a fiber optic endoscope used for medical applications, may be tested and evaluated in order to accurately and quantitatively assess the performance characteristics of the endoscope.

Other advantages of the present invention will become apparent in view of the following detailed description and accompanying drawings.

DETAILED DESCRIPTION OF THE PREFERRED EMBODIMENT

Figure 1:
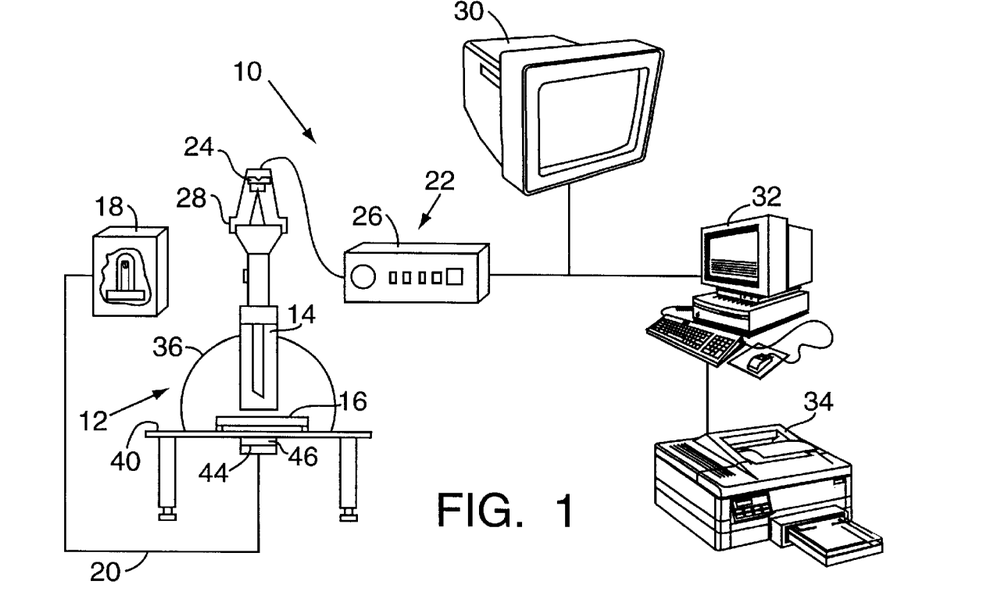
FIG. 1 is a schematic illustration of an apparatus for evaluating the optical performance characteristics of fiber optic endoscopes in accordance with the present invention.

In FIG. 1, an apparatus embodying the present invention for performing MTF tests on endoscopes and for evaluating the optical performance of the endoscopes in dependence on the results of the tests is indicated generally by the reference numeral 10. The apparatus 10 comprises a test station 12 including an adjustable mounting arm 14 for receiving and retaining an endoscope to be tested, and a carrier 16 for positioning a target under the distal end (tip) of the endoscope for performing the MT test.

A variable, high-intensity light source 18, such as a xenon arc lamp or a halogen bulb, delivers light along a fiber optic cable 20 which is detachably connected to directly illuminate the target on the carrier 16. In the currently preferred embodiment, the light source 18 is a variable xenon short-arc lamp, such as the 150 watt lamp sold under model no. 610 by Karl Storz Endoscopy-America Inc. of Culver City, Calif.

A video system 22 generates signals indicative of the image which is projected through the eyepiece at the proximal end of the endoscope. In the preferred embodiment, the video system 22 comprises a charge-coupled device (CCD) video camera 24 coupled to the eyepiece and a video signal processor 26 coupled to the camera. As is known in the art, the CCD video camera records an image by storing charges in a plurality of semiconductor potential wells, thereby defining a two-dimensional array of charges which each correspond to the intensity at a point in the transmitted image. The video signal processor 26 transfers the charges out of the wells and thereby generates time-varying video signals indicative of the recorded image. The CCD video camera 24 is coupled to the endoscope eyepiece with an adjustable vice 28 having a lens system with both zoom and focus control rings. Thus, the projected image may be properly zoomed and focused through the vice lens system 28 before it is recorded by the camera 24.

The video system 22 transmits the signals indicative of the image through a BNC connector to a standard video monitor 30 which displays the image, and to a desktop computer 32 which processes the signals in accordance with the present invention, as is described further below. In the currently-preferred embodiment, the computer 32 is an Intel Pentium™ microprocessor-based desktop computer which includes known computer software and peripheral devices as is necessary for its operation, such as an operating system, a keyboard, a hard disk, random access memory (RAM), a computer monitor and a mouse. The computer 32 further includes a frame grabber card (not shown), which is an analog-to-digital converter for receiving the image signals from the video system 22 and generating in dependence thereon digital signals indicative of the image. The frame grabber card thus translates the image signals from the format of the video system 22 to a digital format which the computer's microprocessor can accept and manipulate. The digital signals generated by the frame grabber card are preferably in the format of a 512 by 512 array of pixel intensities, and thus the number of pixels generated by the card is approximately determined as follows: 512×512=262, 144 pixels.

The frame grabber card is preferably a "plug-in card" which is detachably connected to the system bus of the computer 32 in a known manner. The frame grabber card may be implemented with an "RT Mono"™ video capture board, sold by Digital Vision, Inc. of Dedham, Mass., and driver software sold by ViewPoint Solutions of Rochester, N.Y. for providing an interface between the video capture board and the standard Pentium™-based computer. Alternatively, the frame grabber card may be implemented with an IMAC PCI-1408 video capture board, sold by National Instruments of Austin, Tex. IMAQ Vision software and NI-IMAQ driver software, also sold by National Instruments, may provide the interface between the IMAC PCI-1408 video capture board and the standard Pentium™-based desktop computer.

The computer 32 is coupled in a known manner to a standard printer 34 for printing images processed by the computer. In the preferred embodiment, the printer 34 is a laser printer having a resolution of at least about 600 dots per inch (dpi).

Figure 2:
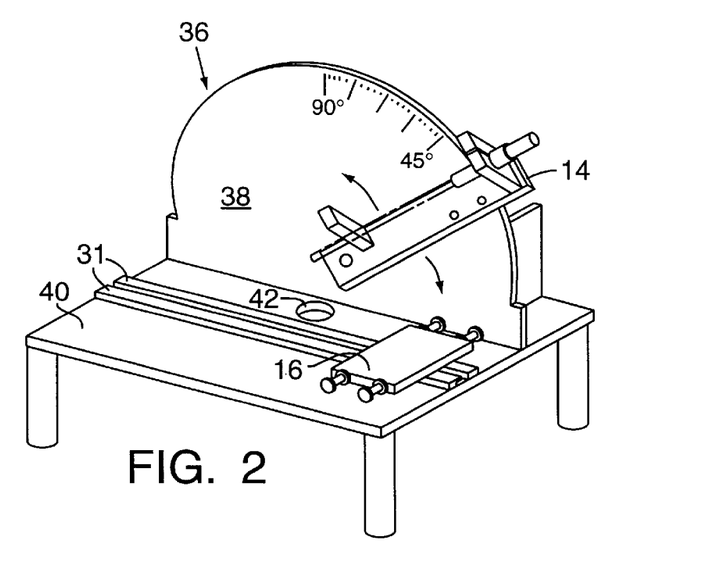
FIG. 2 is a perspective view of a test station of the apparatus of FIG. 1 for accommodating endoscopes of differing optical and physical characteristics, such as differing tip angles, lengths and diameters, with parts removed for clarity.

Turning to FIG. 2, the test station 12 comprises a frame 36 including an upstanding arm support 38, and a carrier support 40 defining a horizontal support surface. As indicated by the arrows in FIG. 2, the mounting arm 14 is pivotally coupled to the arm support 38 and the angular position of the arm is adjustable relative to the carrier support 40 in order to accommodate endoscopes of all possible tip angles. In the preferred embodiment, the mounting arm 14 accepts endoscopes having outer diameters within the range of approximately 1.9 through 10.0 millimeters, lengths within range of approximately 4 inches through 13 inches, and tip angles within the range of approximately 0 degrees through 120 degrees.

As shown in FIG. 2, the carrier 16 is mounted on the carrier support 40 adjacent to the mounting arm 14 and is moveable relative to the mounting arm along rails 31 in order to adjust the position of the carrier relative to an endoscope on the mounting arm. As is described further below, the carrier 16 includes a for performing an MTF test in accordance with the invention in order to evaluate the optical performance of the endoscopes. As described in the above-mentioned co-pending patent applications, the carrier may include additional targets (not shown), in order to perform additional tests and thereby more fully assess the performance of the endoscopes, such as a light loss test, reflective symmetry test, geometric distortion test, and a lighted fibers test. The carrier support 40 defines an aperture 42 extending through the support surface immediately below the base of the mounting arm. In the preferred embodiment of the test station, the aperture 42 is approximately circular and defines a diameter of approximately 1.9 inches.

As shown schematically in FIG. 1, directly beneath the aperture 42 and fixed to the underside of the carrier support 40 is a fiber optic cable holder 44 of a type known to those of ordinary still in the pertinent art. The cable holder 44 receives and retains the fiber optic cable 20 in order to transmit a beam of light from the light source 18, through the aperture 42, the MTF target aligned with the aperture, and in turn into the distal end or tip of an endoscope being tested, as is described further below. A collimating lens 46 is fixed to the underside of the carrier support 40 and covers the aperture 42 in order to collimate the light beam projected through the aperture.

Figure 3:
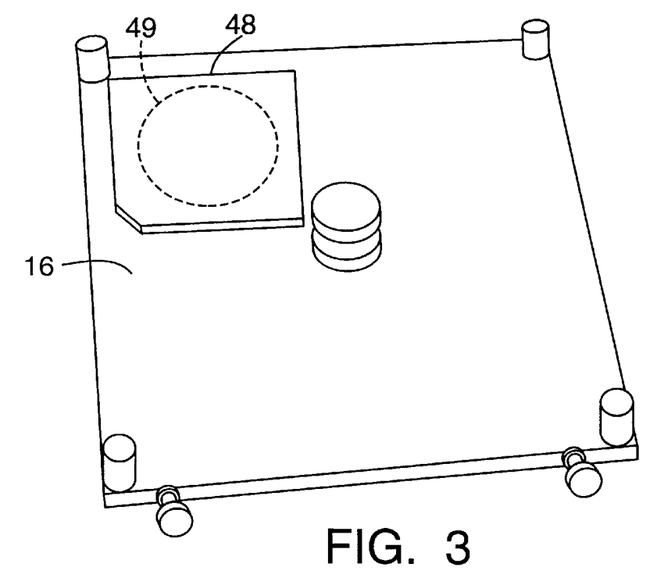
FIG. 3 is a perspective view of the carrier of the test station of FIG. 2 and the associated target for performing the modulation transfer function (MTF) test on the endoscopes in accordance with the present invention.

As shown in FIG. 3, a target 48 is seated over an aperture 49 extending through the carrier 16 for performing the MTF test. The target 48 is formed by a semi-transparent medium, such as a film, defining a transmittance which varies sinusoidally along a predetermined direction within the medium. A beam of light which is filtered through the sinusoidally-varying medium 48 will therefore have an intensity which varies approximately sinusoidally along the predetermined direction within the beam. In the preferred embodiment, the semi-transparent medium 48 has a transmittance which varies approximately sinusoidally along the medium in a first direction, and which is substantially constant along the medium in a second direction transverse to the first direction. Also in the preferred embodiment, the sinusoidally-varying transmittance of the medium defines a spatial frequency of one cycle per millimeter (cycles per unit length), and is preferably of the type sold by Sine Patterns, Inc. of Penfield, N.Y.

Figure 4:
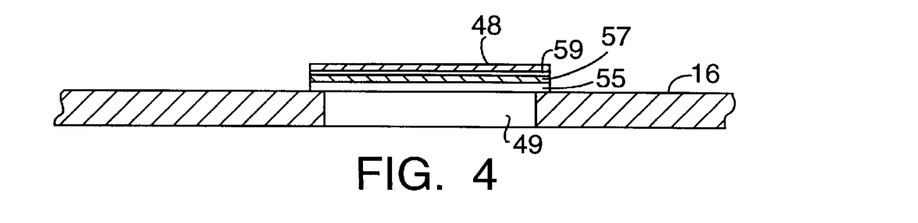
FIG. 4 is a partial cross-sectional view of the carrier of FIG. 3 illustrating the target for performing the MTF test in further detail.

As further illustrated in FIG. 4, a diffusing opal glass plate 55 is superimposed over the aperture 49 in the carrier 16, a white plastic translucent sheet 57 is superimposed over the glass plate, and the sinusoidally-varying medium 48 is seated over the plastic sheet. As is described further below, when performing the MTF test the carrier 16 is positioned to align the circular aperture 49 with the aperture 42 of the carrier support 40, and the free end of the fiber optic cable 20 is mounted beneath the aperture 42 to transmit a beam through the apertures, and in turn through the glass plate 55, white plastic sheet 57 and sinusoidally-varying medium 48. The glass plate 55 and plastic sheet 57 together diffuse the beam from the fiber optic cable, creating a beam of substantially uniform intensity, and the sinusoidally-varying medium 48 in turn filters the substantially uniform intensity beam to generate a beam which varies approximately sinusoidally along the first direction.

A black paper mask 59 defining a plurality of apertures is preferably inserted between the sinusoidally-varying medium 48 and the white plastic sheet 57 in order to block light transmission through portions of the medium, and thereby enhance selected points in an image corresponding to the non-masked (illuminated) portions of the medium. As is further described further below, each aperture of the black paper mask 59 defines a respective portion of the transmitted beam image within which the MTF is measured.

TEST PERFORMANCE

Figure 5:
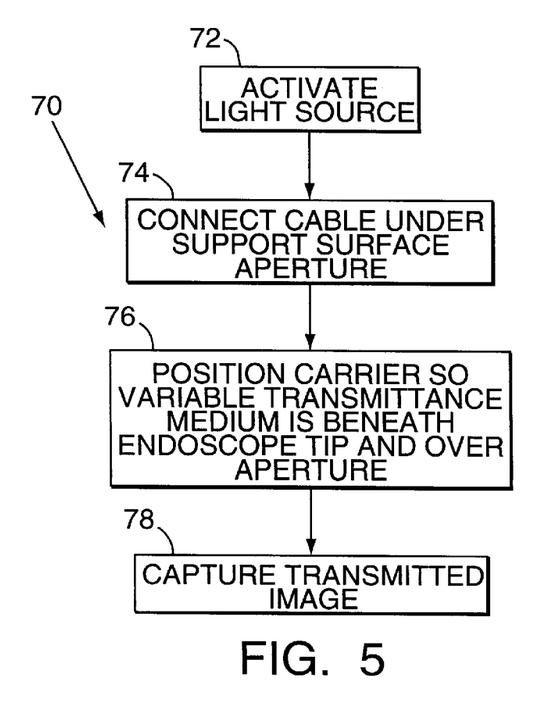
FIG. 5 is a flow chart illustrating conceptually the procedural steps for performing the MTF test on endoscopes in the apparatus of FIG. 1.

FIG. 5 illustrates a flow chart 70 for performing the MTF test for measuring the modulation transfer function (MTF) of the endoscope at a predetermined spatial frequency, which is equivalent to measuring the modulation transfer ratio (MTR) of the endoscope while it transmits an image having an intensity which varies along a direction at the predetermined spatial frequency.

Figure 6:
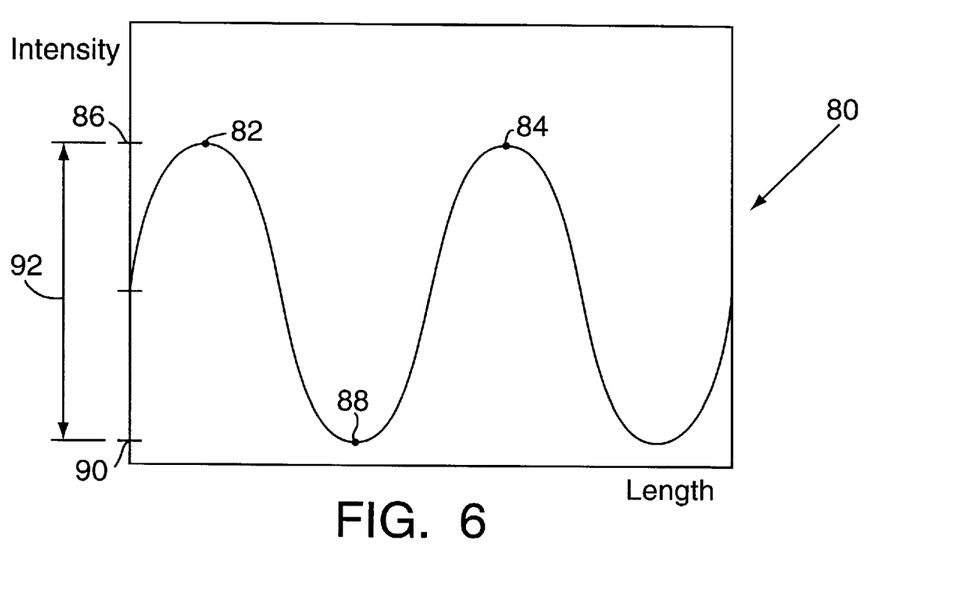
FIG. 6 is an exemplary graph illustrating the intensity of a light beam generated by the light source of the apparatus of FIG. 1 before transmission through an exemplary endoscope.
Figure 7:
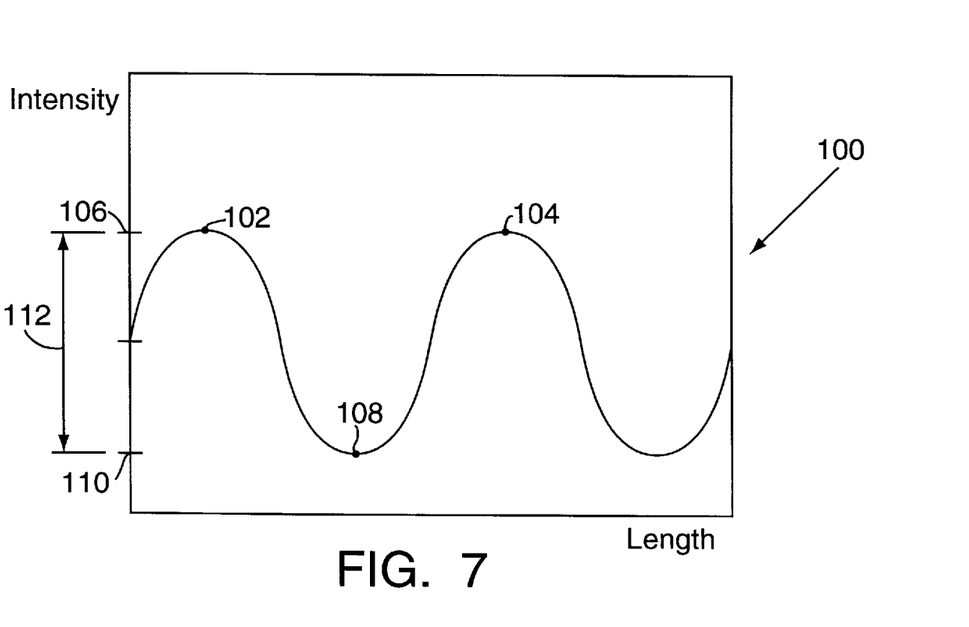
FIG. 7 is an exemplary graph illustrating the intensity of a light beam generated by the light source of the apparatus of FIG. 1 after transmission through an exemplary endoscope.

FIGS. 6 and 7 illustrate the maximum and minimum intensities in an image before and after transmission through an endoscope, respectively. The graph 80 in FIG. 6 represents the sinusoidally-varying intensity of an image which is received at the endoscope tip (i.e. before transmission through the endoscope). Points 82 and 84 have a maximal intensity 86, while a point 88 has a minimal intensity 90. The intensity variation 92 in the image before transmission is the difference between the maximal intensity 86 and the minimal intensity 90.

The graph 100 in FIG. 7 represents the sinusoidally-varying intensity of an image after transmission through the endoscope. Points 102 and 104 have a maximal intensity 106, while a point 108 has a minimal intensity 110. The points 102, 108 and 104 of the transmitted image (FIG. 7) correspond respectively to the points 82, 88 and 84 of the received image (FIG. 6). The intensity variation 112 in the image after transmission is the difference between the maximal intensity 106 and the minimal intensity 110.

The intensity variation 112 in the image after transmission is less than the intensity variation 92 in the image before transmission. In other words, transmission through the endoscope reduces the sharpness of the image. The MTF test is directed to measuring this reduction in sharpness at different locations in the transmitted image.

Referring again to FIG. 5, in performing the MTF test, the light source 18 (FIG. 1) is activated (step 72) and set to a selected intensity level. The selected intensity level is an intensity which results in a transmitted image, described below, defining intensities within the preferred measurement range of the device for measuring the intensity, which is the video system 22 in the preferred embodiment. For example, a selected intensity level which is too low will result in a transmitted image defining a majority of dark (unilluminated) locations, while a selected intensity level which is too high will result in a transmitted image defining intensities too high for the video system to measure.

The free end of the fiber optic cable 20 (FIG. 1) is attached to the fiber optic cable holder 44 (FIG. 1) mounted below the aperture 42 of the carrier support 40 (step 74), in order to transmit a light beam through the aperture 42. The carrier 16 is then positioned so that the sinusoidally-varying medium 48 is positioned directly underneath the endoscope tip and above the carrier support aperture 42 (step 76), thereby filtering the beam projected from the fiber optic cable and transmitting the filtered beam through the endoscope. The frame grabber card stores the transmitted image and generates digital signals indicative of the image (step 78).

The MTF test described above provides test results comprising a set of signals indicative of intensities at predetermined locations in a beam of light transmitted through the endoscope. As hereinafter described, the system of the invention further generates a second set of signals responsive to the test result signals which is indicative of the performance characteristics of the endoscope.

TEST RESULT EVALUATION

Figure 8:
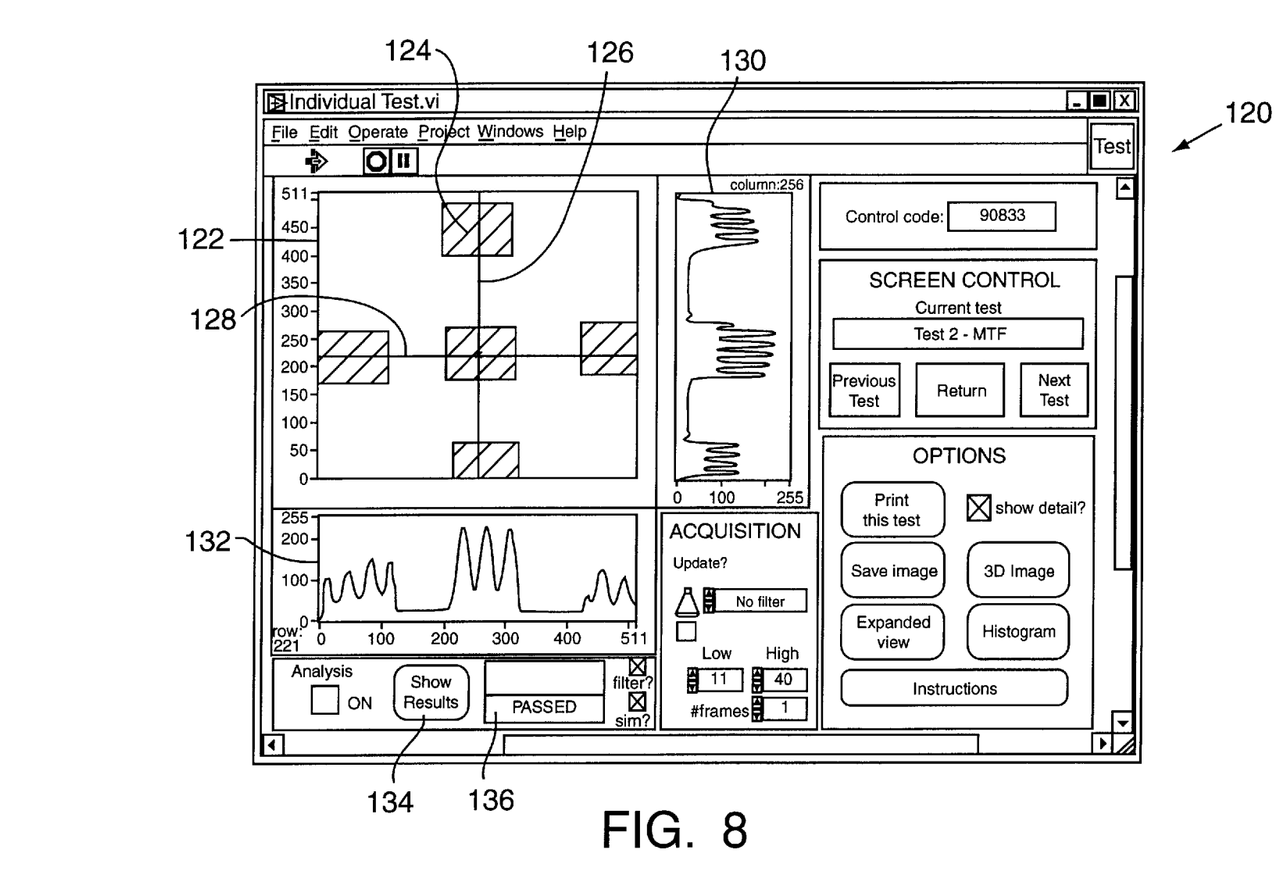
FIG. 8 is an exemplary display of a graphical user interface provided by the computer of FIG. 1 for evaluating the results of an MTF test.

The computer system 32 (FIG. 1) receives the signals indicative of the beam intensities, and generates the second set of signals in accordance with the intensity signals. FIG. 8 shows an exemplary display 120 of a graphical user interface (GUI) generated and displayed on the monitor of the computer system 32. As is known in the art, a GUI provides both a means for user input and a means for the computer system to display information. The GUI provides signals indicative of the type of test, typically in accordance with user commands such as the actuation of graphical buttons and switches. In the preferred embodiment, the GUI is implemented using LabVIEW® software sold by National Instruments of Austin, Tex. Accordingly, the various types of displays and input methods of the GUI described herein are those which are most easily implemented with LabVIEW® software. However, those skilled in the art will recognize that other types displays and input methods may be implemented, including other forms of graphical, textual and audio input and output.

The display 120 includes a region 122 showing a graphical display of an intensity pattern of the transmitted beam. In the preferred embodiment, the region 122 defines a two-dimensional array of pixels, and each pixel has a respective color (e.g., a shade of gray) indicating the intensity of the transmitted beam at a location in the beam corresponding to the location of the pixel. Also in the preferred embodiment, a substantially white pixel indicates a location in the beam with the highest intensity relative to all pixels, while a substantially black pixel indicates a location in the beam with the lowest intensity relative to all pixels.

With reference to the display region 122, the apertures of the black paper mask 59 (FIG. 4) each define a respective region 359 of the transmitted beam image within which the MTF is measured. In the preferred embodiment, and as shown in FIG. 19, the MTF is measured at the approximate center of the transmitted image, and at select locations on the periphery of the transmitted image, including above center, below center, to the right of center, and to the left of center.

Referring to the exemplary graphical image shown in the region 122 of FIG. 8, the region 122 defines five illuminated regions 124, each corresponding to a respective aperture of the black mask 59 (FIG. 4), and defining an intensity which varies approximately sinusoidally across the respective region, as indicated by the variations in color (or shading). As shown, the pixels sinusoidally progress across each region from darker shades, corresponding to lower intensities, to lighter shades, corresponding to higher intensities.

The region 122 further includes a vertical indicator bar 126 and a horizontal indicator bar 128 which may be moved horizontally and vertically, respectively, within the region 122 by appropriate user command (e.g. a mouse action or keyboard key press). Each bar 128 and 126 defines a plurality of collinear pixels in the display and, thus, corresponds to a plurality of approximately collinear locations within the transmitted beam.

The display 120 further includes a vertical cross-section display region 130 showing a graphical display indicative of the intensity of the transmitted beam in the approximately collinear locations defined by the vertical bar 126 of the region 212. The intensity curve shown in the region 130 is formed by a plurality of pixels each having a vertical position corresponding to the vertical position of a pixel in the region 122 along the vertical bar 126, and a horizontal position corresponding to the intensity of that pixel.

Similarly, the display 120 further includes a horizontal cross-section display region 132 showing a graphical display indicative of the intensity of the transmitted beam in the approximately collinear locations defined by the horizontal bar 128 of the region 122. The intensity curve shown is formed by a plurality of pixels each having a horizontal position corresponding to the horizontal position of a pixel in the region 122 along the horizontal bar 128, and a vertical position corresponding to the intensity of that pixel.

The three regions 122, 132 and 130 (FIG. 8) each provide an indication of the MTF values at the predetermined locations. A user may be able to evaluate an endoscope based on this type of graphical feedback alone, and determine whether or not the endoscope is acceptable. However, as discussed below, the computer system 32 of the invention further provides an explicit indication of whether the tested endoscope passes a threshold standard for the MTF test.

Figure 9:
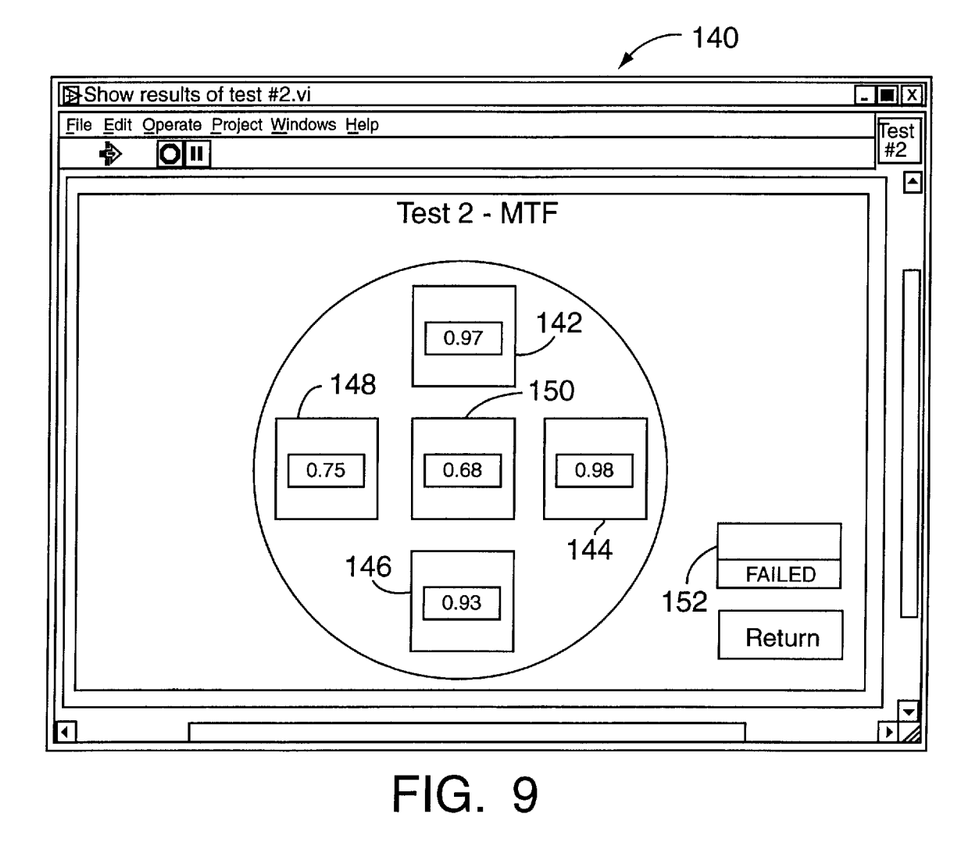
FIG. 9 is another exemplary display of a graphical user interface provided by the computer of FIG. 1 for evaluating the results of an MTF test.

Upon actuation of a button 134 in the display 120, the GUI provides a display 140 of the type shown in FIG. 9. The display 140 includes indicators 142, 144, 146, 148 and 150 which each indicate the MTF at a respective one of the selected locations within the transmitted beam.

As discussed above, the sinusoidally-varying medium 48 causes the intensity of the transmitted beam to vary sinusoidally along a predetermined direction in the beam, and the video signals generated by the video system 22 correspondingly vary sinusoidally with respect to time and thus are indicative of the intensity pattern of the transmitted image. The maximum and minimum intensities used in calculating the modulation are each measured with respect to an intensity of the video signal corresponding to a "black" (dark or unilluminated) intensity. Those skilled in the art will note that the signal intensity corresponding to "black" is different from the "back porch" level of the video signal, which is typically lower.

Figure 10:
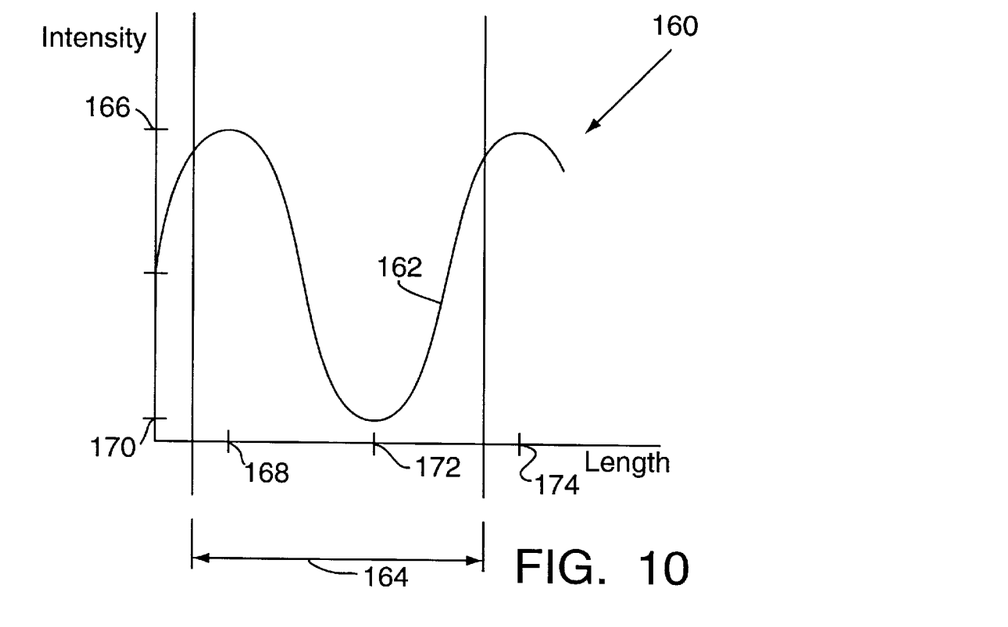
FIG. 10 is an exemplary graph illustrating the definition of modulation at a location within an image transmitted through an endoscope.

FIG. 10 depicts a graph 160 illustrating the definition of modulation at a location within a light beam. The graph 160 includes a curve 162 representing an intensity which varies sinusoidally along a predetermined direction. At a location defined by a range 164 along the predetermined direction, the intensity varies from a maximum intensity 166 at a distance 168 along the predetermined direction to a minimum intensity 170 at a distance 172 along the predetermined direction. Thus, the modulation at a location defined by the range 164 may be determined from the maximum intensity 166 and minimum intensity 170 in the manner defined above. In another embodiment, the maximum intensity used in the modulation determination is the average of the maximum intensities of two consecutive cycles, such as the intensities at distances 168 and 174. Using an average of two maximum intensities accounts for maximum intensities which vary significantly among consecutive cycles, such as is common at the periphery of the transmitted image where the intensity sharply declines.

The MTF value of a system is equal to the product of the MTF values of the components of the system. The above-described MTF values are generated in dependence on the signals generated by the frame grabber card, and represent the MTF value of the combination of the endoscope and the video system 22. However, since the video system is typically optically superior to the endoscope, a fixed correction factor can be calculated for the video system and used in determining the MTF of the endoscope alone. According to "Video Engineering" by Andrew Inglis, McGraw Hill, 1993, which is hereby expressly incorporated by reference as part of the present disclosure, a correction factor of 0.96 is appropriate for video systems such as those used in the present invention. Furthermore, the precision microdensitometer modulation calibration of the sinusoidally-varying medium 48 also affects the MTF of the entire endoscope evaluation apparatus. The sinusoidally-varying medium 48 provided by Sine Patterns, Inc. has a modulation calibration of 0.81366. Accordingly, the MTF value for the endoscope alone is determined by dividing the above-calculated MTF (which is equivalent to the MTR) by the following product: (0.96)*(0.81366).

Referring again to FIG. 9, each of the indicators 142, 144, 146, 148 and 150 further indicates whether an MTF value indicates either a "pass" or "fail" condition. In the preferred embodiment, each MTF value is compared to a predetermined MTF threshold. MTF values which are below the predetermined MTF threshold are considered "fail" values. If at least one of the plurality of MTF values is a fail value, the endoscope has failed the MTF test. Textual displays 152 (FIG. 9) and 136 (FIG. 8) indicate whether the endoscope has passed the MTF test. In the preferred embodiment, for 10 millimeter diameter endoscopes with 0 degree tip angles, the MTF threshold at the center of the transmitted beam is approximately 0.70, and at other locations in the transmitted beam is approximately 0.20.

As is known in the art, a spatial frequency is defined by the number of cycles (transitions from a maximum intensity to a minimum intensity and back again) per unit of length. The sinusoidally-varying medium 48 (FIG. 3) is preferably implemented as the above-mentioned sinusoidally-varying medium having a spatial frequency of one cycle per millimeter. Thus, filtering a beam of light through this medium during the MTF test generates a beam having an intensity which varies approximately sinusoidally along a first direction in the generated beam at a spatial frequency of about one cycle per millimeter, and which is approximately constant along a second direction in the generated beam. The generated beam is transmitted through the endoscope and recorded by the video system 22 (FIG. 1) as set forth above.

The video system 22 records the transmitted image in a conventional manner: the CCD camera sequentially scans in a horizontal scan direction from one end of the transmitted image to the other, defining a scan row, and the video system generates time-varying video signals indicative of a row of pixels for the scanned row. In other words, the video signals generated by the video system 22 correspondingly vary sinusoidally with respect to time and thus are indicative of the intensity pattern of the transmitted image along the scan row. After scanning a row, the CCD camera proceeds to scan the next row until all rows have been scanned and all pixels have been generated.

With the sinusoidally-varying medium described above, each row across the transmitted beam has an approximately-sinusoidal intensity variation. The frequency of the transmitted beam, in units of cycles per degree of the apparent field of view of the endoscope, is defined not only by the spatial frequency of the medium but also by the distance between the medium and the endoscope tip. As is described below, this distance is selected so that the frequency of the transmitted beam is approximately six cycles per degree of apparent field of view. In accordance with a further aspect of the invention, it has been determined that MTF measurements at a single spatial frequency of approximately six cycles per degree of apparent field of view are an accurate indication of optical instrument performance.

Figure 11:
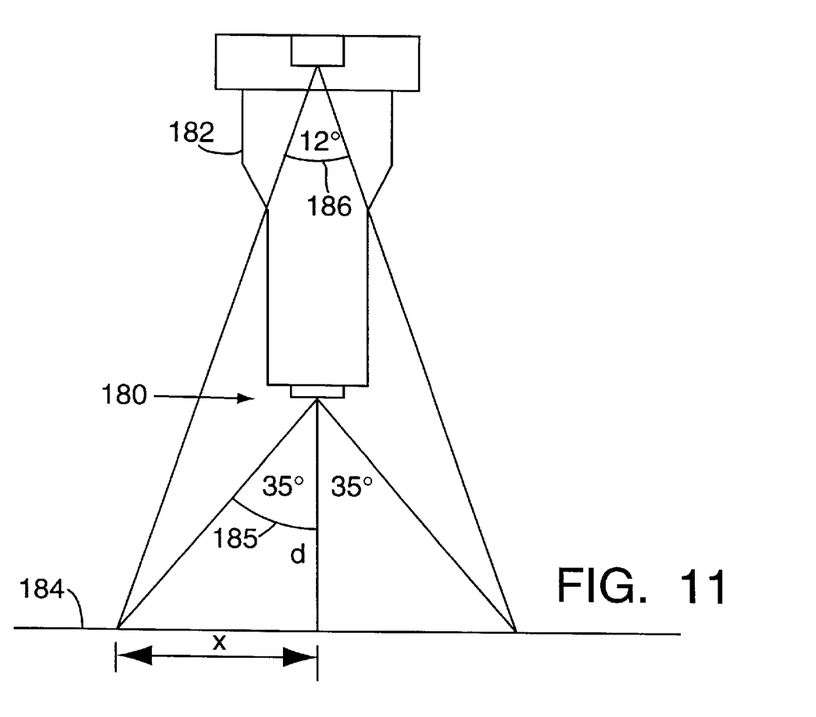
FIG. 11 is a schematic illustration of the distal end of an exemplary endoscope spaced apart from a sinusoidally-varying medium for purposes of performing the MTF test in the apparatus of FIG. 1 in accordance with the present invention.

FIG. 11 is a schematic illustration provided for purposes of determining the frequency of the transmitted beam. The tip 180 of an exemplary endoscope 182 is spaced a predetermined distance "d" from a sinusoidally-varying medium 184. The exemplary endoscope 182 has an actual field of view of seventy degrees, which is an angle 185 of thirty five degrees to each side. The actual field of view is defined as the angular extent of an object visible through the endoscope subtended at the tip of the endoscope. Thus, the length "x" of the medium visible in each thirty five degree field of view is determined as follows:

$$x = (\tan 35°)(d) = (0.7)(d) \text{ millimeters} \quad (1)$$

Accordingly, the length of the medium which lies in the entire seventy degree field of view is twice the length "x" as defined in equation (1):

$$2x = 2(d)(\tan 35°) = (1.4)(d) \text{ millimeters} \quad (2)$$

In the preferred embodiment, since the medium 184 defines a spatial frequency of approximately one cycle per millimeter, the number of cycles across the medium in this direction is determined approximately as follows:

| (3) | total cycles | = (1 cycle/millimeter) (2× millimeters) |
|---|---|---|
| | | = (1 cycle/millimeter) ((1.4) (d) millimeters) |
| | | = (1.4) (d) cycles in the apparent field of view. |

As discussed above, in the preferred embodiment the desired frequency of the transmitted beam is six cycles per degree of apparent field of view. The exemplary endoscope 182 has an apparent field of view 186 of twelve degrees. The apparent field of view is the angle between the right and left sides of the image as subtended by the eye. The desired number of cycles across the medium 184 in the apparent field of view is determined approximately as follows:

(6 cycles/degree)(12 degrees)=72 cycles in the apparent field of view. (4)

Accordingly, the value of "d" is determined from the equality of relationships (3) and (4) for the desired number of cycles in the field of view:

| (5) | (1.4) (d) = 72 |
|---|---|
| (6) | d = 72/1.4 |
| | = 51.4 millimeters |
| | = 2.02 inches |

Thus, the tip 180 of the endoscope 182 is spaced approximately two inches from the medium 184. Since the distance d is known, the length of the medium which lies in the field of view is determined as follows:

| (7) | 2× = (1.4) (d) |
|---|---|
| | = (1.4) (2.02 inches) |
| | = 2.83 inches |

Conventional video systems scan at a rate of approximately one frame every 1/30th of a second. Since each frame comprises a two-dimensional array which is 512 pixels×512 pixels, the video system 22 scans 512 rows every 1/30th of a second. Thus, the video system scans one row every 1/15360th of a second (about one row every 65 microseconds). Since, from relationship (4) above, there are seventy two cycles in the field of view, the video system 22 scans 72 cycles in 65 microseconds if the horizontal scan direction is substantially parallel to the direction along the medium which varies at one cycle per millimeter.

The scan rate of 72 cycles in 65 microseconds defines a video frequency of the time-varying video signals which the video system generates:

72 cycles/65 microseconds=1.1 megahertz (MHz)

Of course, the video frequency is easily determined for video systems which scan at a rate different than one frame every 1/30th of a second, and for video systems which scan at a number of cycles in the apparent field of view different than 72 cycles.

As set forth above, the time-varying video signals, like most signals, are at least partially corrupted by noise. In conventional video systems, the predominant form of noise is a color subcarrier signal having a frequency of approximately 3.57 MHz. The above-stated video frequency of 1.1 MHz is so close to the noise frequency of 3.57 MHz that a conventional low-pass filter, such as a Butterworth filter implemented in the frame grabber card, will not be able to substantially attenuate the noise signals without also attenuating the video signals. Thus, the filter will not be able to improve the signal-to-noise ratio.

Two quantities which determine the video frequency, the spatial frequency of the sinusoidally-varying medium 48 and the scan time of the video system 22, cannot easily be adjusted. The spatial frequency of the sinusoidally-varying medium is selected for efficiently testing the endoscope, and the scan time of the video system cannot be changed without significant hardware redesign. Accordingly, the video frequency is preferably not adjusted by adjusting either of these two values. However, if the horizontal scan direction is transverse to the direction along the medium in which the intensity varies at one cycle per millimeter, then the video system scans less than 72 cycles in 65 microseconds. The number of cycles scanned in a row decreases as the scan direction becomes less parallel and more perpendicular to the direction of variance in the medium. As will be seen below, the frequency of the video signal will likewise decrease, further separating the video frequency from the noise frequency and thereby facilitating noise filtering.

Figure 12:
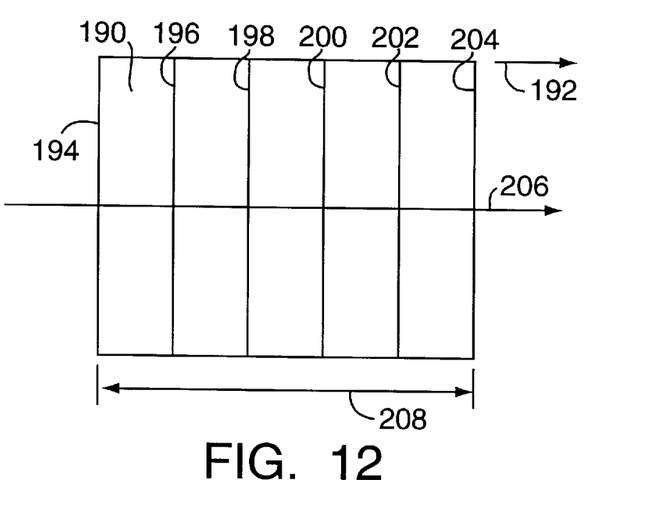
FIG. 12 is an exemplary, schematic illustration of the relative orientation between a sinusoidally-varying medium used to perform the MTF test in accordance with the present invention and a scan direction parallel to the direction of variation in the transmittance of the medium.
Figure 13:
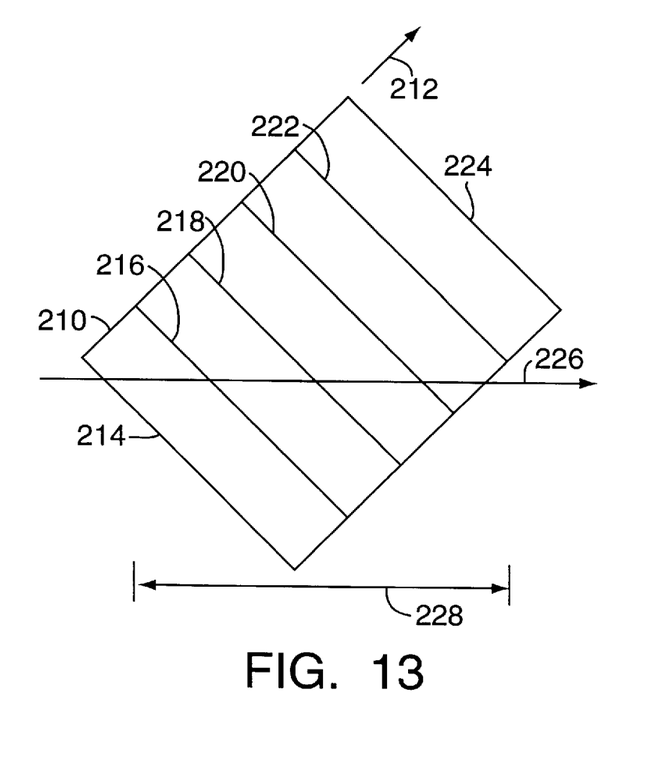
FIG. 13 is an exemplary, schematic illustration of another sinusoidally-varying medium used to perform the MTF test in accordance with the present invention and having an orientation relative to the scan direction different than the orientation of FIG. 12.

FIGS. 12 and 13 illustrate the manner in which the total number of cycles scanned depends on both the horizontal scan direction and the direction along the medium which varies at one cycle per millimeter. FIG. 12 shows in schematic form an exemplary medium 190 in which the transmittance varies sinusoidally along a direction 192. Maxima (or cycles) in the transmittance are indicated by reference numerals 194, 196, 198, 200, 202 and 204. Thus, the medium 190 illustrated in FIG. 12 includes six cycles along the direction 192. A horizontal scan direction 206 is substantially parallel to the direction 192 of the medium 190. Accordingly, a scan across the scan direction 206 crosses six cycles from one end of the medium 190 to the other across a distance 208.

FIG. 13 shows in schematic form another exemplary sinusoidally-varying medium 210 which is substantially identical to the medium 190 of FIG. 12 but rotated with respect to the horizontal scan direction. The medium 210 defines a transmittance which varies sinusoidally along a direction 212. Maxima (or minima) in the transmittance are indicated by reference numerals 214, 216, 218, 220, 222 and 224. Thus, the medium 210 includes six cycles along the direction 212. As shown, a horizontal scan direction 226 is transverse to the direction 212 of the medium 210. Accordingly, a scan across the scan direction 226 crosses less than six cycles from one end of the medium 210 to the other across a distance 228 equal to the distance 208 in FIG. 12.

Thus, decreasing the number of cycles scanned in a row by selecting a scan direction transverse to the direction of variance in the medium will likewise decrease the video frequency without changing the spatial frequency of the image. In fact, the angle between the scan direction and the direction of variance in the medium defines the decrease in the video frequency. The number of cycles scanned in a row is determined by the relationship:

Cycles scanned=(Max Cycles) (cos $\theta$)

wherein:

$\theta$ is the angle between the scan direction and the direction of variance in the medium; and Max Cycles is the number of cycles scanned when $\theta=0$.

Similarly, the frequency of the video signal is determined by the relationship:

Frequency=(Max Frequency) (cos $\theta$)

wherein:

Max Frequency is the frequency when $\theta=0$.

Thus, to divide the video frequency of 1.1 MHz by a factor of three, the angle $\theta$ is selected in accordance with the following relationship:

Frequency=(Max Frequency) (cos $\theta$)

1.1/3=(1.1) (cos$\theta$)

⅓=cos$\theta$ $\theta$=71 degrees

Thus, orienting the sinusoidally-varying medium relative to the horizontal scan direction of the video system to form a 71 degree angle between the scan direction and the direction of variance in the medium reduces the video frequency approximately as follows: 1.1 MHz/3=0.37 MHz. This reduced video frequency is more easily distinguished from the noise frequency of 3.57 MHz by a low pass filter. For example, a fourth-order Butterworth filter having a "cut-off" frequency of 0.66 MHz substantially attenuates the 3.57 MHz noise signal while attenuating the 0.37 MHz video signal by less than 0.1 dB.

Of course, other values for the angle $\theta$ will reduce the video frequency by different amounts. For example, an angle of 40 degrees yields a decrease by a factor of 1.4, while an angle of 89 degrees yields a decrease by a factor of 57. Greater decrease factors may be produced by selecting angles which are even closer to 90 degrees, but selecting an angle of 90 degrees results in a frequency of zero.

As is known in the art, the fourth-order Butterworth filter has overshoot and ringing characteristics for step input signals. However, according to the "Handbook of Filter Synthesis" by Anatol Zverev, John Wiley and Sons, Inc., 1967, which is hereby expressly incorporated by reference as part of the present disclosure, the overshoot and ringing is reduced to about 1% after a delay of 10 normalized periods of the filter cut-off frequency. This delay is, in this filter, only approximately 2.4 microseconds, which is less than 4.4% of the horizontal scan time and thus not a significant source of error.

Figure 14:
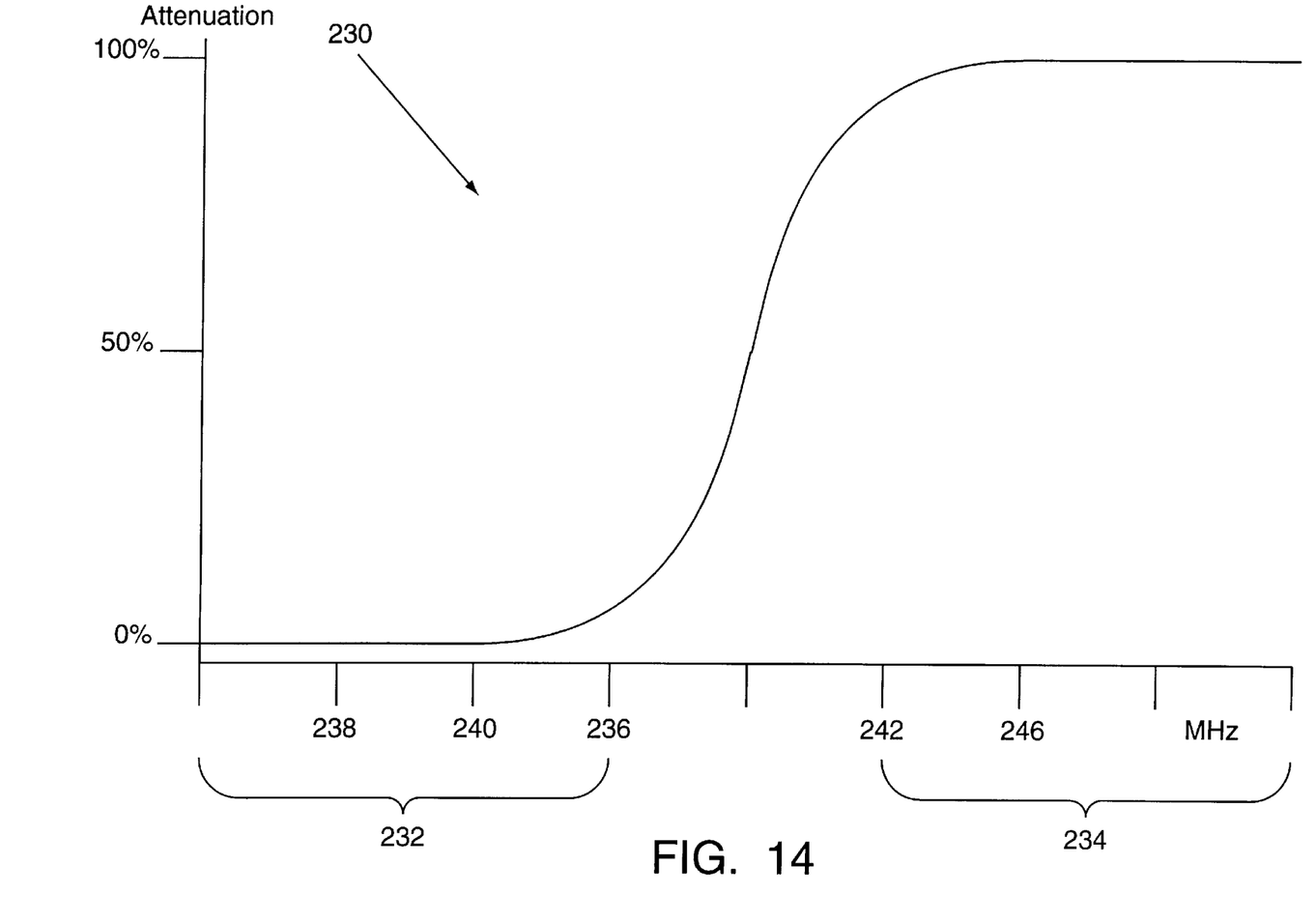
FIG. 14 is an exemplary graph illustrating in simplified form the attenuation characteristics of a low-pass filter.

FIG. 14 depicts an exemplary graph 230 illustrating in simplified form the attenuation characteristics of a low-pass filter. The graph 230 defines a first set of frequencies 232 which are virtually unattenuated, and a second set of frequencies 234 which are substantially completely attenuated. A frequency 236 is the video frequency, such as 1.1 MHz, when the horizontal scan direction is parallel to the direction of variance in the medium. A frequency 238 is the video frequency, such as 0.37 MHz, after selecting a horizontal scan direction transverse to the direction of variance in the medium. A frequency 240 defines a threshold below which the filter does not substantially attenuate signals. Another threshold frequency 242 defines the frequencies above which the filter substantially completely attenuates signals. Finally, a frequency 246 is the noise frequency, such as 3.57 MHz. The filter substantially attenuates the noise frequency 246 since it is greater than the frequency 242. In addition, the filter passes substantially unattenuated the frequency 238 since it is less than the frequency 240.

In response to a user command input through the GUI, the computer system 32 transmits any of the above-described displays to the printer 34 of FIG. 1. The printed display is useful in the analysis of test results, and thus in evaluating the performance characteristics of tested endoscopes, in that it may be transmitted (i.e., sent by mail, electronic mail or facsimile) to distant users unable to view, or otherwise access the monitor or computer system of FIG. 1.

Although the invention has been shown and described with respect to a preferred embodiment thereof, it would be understood by those skilled in the art that other various changes, omissions and additions thereto may be made without departing from the spirit and scope of the invention as defined in the appended claims. For example, many types of optical systems besides endoscopes may benefit from the above-described method and apparatus for filtering noise which is introduced during the performance of an MTF test.

In addition, there are other fiber-optic scopes, known as bore scopes, which are similar to endoscopes for use in medical applications, but have much larger length-to-diameter ratios. Bore scopes are used to examine the internal subassemblies in large engines, compressors and turbine machinery. Such bore scopes may be tested and evaluated using the system of the present invention with minimal modification of the preferred embodiment presented herein.

Accordingly, this detailed description of a preferred embodiment is to be taken in an illustrative, as opposed to a limiting sense.

What is claimed is:

1. A method for performing an MTF test on an endoscope and evaluating the results of the test, comprising:

generating a beam having an intensity which is uniform along a first direction and which varies periodically along a second direction transverse to the first direction, the beam thereby defining a first frequency in accordance with the rate at which the intensity varies along the second direction;

transmitting the generated beam through the endoscope;

generating intensity signals indicative of the transmitted beam intensity;

filtering noise signals from the intensity signals; and generating signals indicative of the modulation at a predetermined location within the transmitted beam in dependence on the filtered intensity signals.

2. The method of claim 1, further comprising:

generating intensity signals indicative of the transmitted beam intensity at locations which are collinear in a third direction transverse to the second direction, the intensity signals thereby defining a second frequency in accordance with the rate at which the intensity varies along the third direction, the second frequency thereby being lower than the first frequency; and filtering noise signals from the intensity signals, at least one noise signal having a third frequency which is greater than the second frequency.

3. The method of claim 2, further comprising generating a beam having an intensity which varies periodically along the second direction at a rate of approximately six cycles per degree of apparent field of view of the endoscope.

4. The method of claim 2, further comprising generating a beam having an intensity which varies substantially sinusoidally in the second direction.

5. The method of claim 2, wherein the step of filtering the noise signals comprises:

substantially attenuating noise signals which are greater than a fourth frequency less than the third frequency;

passing substantially unattenuated those signals which are less than a fifth frequency; and selecting the third direction such that the second frequency is less than the fifth frequency.

6. The method of claim 2, further comprising passing a beam of substantially uniform-intensity light through a medium having a transmittance which varies periodically.

7. The method of claim 2, further comprising:

generating signals indicative of the modulation at a first location in dependence on the filtered intensity signals; and generating signals indicative of the modulation at a second location spaced radially from the first location in dependence on the filtered intensity signals.

8. The method of claim 2, further comprising:

generating signals indicative of the modulation transfer function at a predetermined location based on the filtered intensity signals.

9. A method for performing a MTF test on an endoscope and evaluating the results of the test, comprising:

filtering a beam through a semi-transparent medium defining a transmittance which is uniform along a first direction within the medium and which varies approximately sinusoidally in a second direction along the medium, thereby defining a generated beam having an intensity which varies approximately sinusoidally across the beam, and the beam thereby defining a first frequency in accordance with the rate at which the intensity varies;

transmitting the filtered beam through the endoscope;

selecting a third direction which forms an angle with the second direction of between approximately 40 degrees and approximately 90 degrees, the angle corresponding to a desired reduction in the first frequency;

scanning across the transmitted beam in the third direction, and in turn generating intensity signals indicative of the transmitted beam intensity along the third direction, the intensity signals thereby defining a second frequency which is less than the first frequency;

filtering noise signals having a third frequency which is greater than the second frequency from the intensity signals; and generating signals indicative of the modulation at a location within the beam based on the filtered intensity signals.

10. An apparatus for performing a MTF test on an endoscope and evaluating the results of the test, comprising:

a semi-transparent medium defining a transmittance which is approximately uniform along a first direction within the medium and which varies periodically along a second direction within the medium to thereby generate a beam transmitted through the medium defining an intensity which varies periodically across the beam, and a first frequency in accordance with the rate at which the intensity varies;

means for transmitting a beam of light through the semi-transparent medium, and in turn transmitting the filtered beam through the endoscope;

means for scanning across the transmitted beam in a third direction transverse to the second direction, and in turn generating intensity signals indicative of the transmitted beam intensity along the third direction, the intensity signals thereby having a second frequency which is less than the first frequency;

means for filtering noise signals having a third frequency which is greater than the second frequency from the intensity signals; and means for generating signals indicative of the modulation at a location in dependence on the filtered intensity signals.

* * * * *